US008996557B2

(12) United States Patent
Koishida et al.

(10) Patent No.: US 8,996,557 B2
(45) Date of Patent: Mar. 31, 2015

(54) QUERY AND MATCHING FOR CONTENT RECOGNITION

(75) Inventors: Kazuhito Koishida, Redmond, WA (US); David Nister, Bellevue, WA (US); Ian Simon, Seattle, WA (US); Tom Butcher, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 49 days.

(21) Appl. No.: 13/110,185

(22) Filed: May 18, 2011

(65) Prior Publication Data

US 2012/0296938 A1    Nov. 22, 2012

(51) Int. Cl.
G06F 17/30    (2006.01)

(52) U.S. Cl.
CPC ............................... *G06F 17/30743* (2013.01)
USPC ........................................................ 707/765

(58) Field of Classification Search
CPC ................... G06F 17/30672; G06F 17/30389; G06F 17/30967; G06F 17/30646; G06F 17/2765
USPC ........................................................ 707/765
See application file for complete search history.

(56) References Cited

U.S. PATENT DOCUMENTS

| | | | |
|---|---|---|---|
| 6,990,453 B2 | 1/2006 | Wang | |
| 6,995,309 B2 | 2/2006 | Samadani et al. | |
| 7,359,889 B2 | 4/2008 | Wang et al. | |
| 7,627,477 B2 | 12/2009 | Wang et al. | |
| 7,739,062 B2 | 6/2010 | Wang | |
| 2002/0083060 A1* | 6/2002 | Wang et al. | ............. 707/10 |
| 2005/0215239 A1* | 9/2005 | Kopra et al. | ............. 455/414.1 |
| 2007/0131094 A1 | 6/2007 | Kemp | |
| 2007/0143777 A1 | 6/2007 | Wang | |
| 2009/0006102 A1* | 1/2009 | Kan et al. | ............. 704/500 |

OTHER PUBLICATIONS

Tong Zhang, "Audio Content Analysis for Online Audiovisual Data Segmentation and Classification", IEEE, May 2001, pp. 441-457.*
Ahmad, Iftikhar, et al., "Audio-based Queries for Video Retrieval over Java Enabled Mobile Devices", Proc. of SPIE-IS&T Electronic Imaging, SPIE vol. 6074, 607409, Published Date: 2006, http://sp.cs.tut.fi/publications/archive/Ahmad2006-Audio.pdf.
Kiranyaz, Serkan, et al., "A Novel Multimedia Retrieval Technique: Progressive Query (Why Wait?)", Published Date: 2004, http://www.cs.tut.fi/~moncef/publications/novel-multimedia-retrieval.pdf.

(Continued)

*Primary Examiner* — Rehana Perveen
*Assistant Examiner* — Alexander Khong
(74) *Attorney, Agent, or Firm* — Steven Spellman; Jim Ross; Micky Minhas

(57) ABSTRACT

Various embodiments enable audio data, such as music data, to be captured, by a device, from a background environment and processed to formulate a query that can then be transmitted to a content recognition service. In one or more embodiments, multiple queries are transmitted to the content recognition service. In at least some embodiments, subsequent queries can progressively incorporate previous queries plus additional data that is captured. In one or more embodiments, responsive to receiving the query, the content recognition service can employ a multi-stage matching technique to identify content items responding to the query. This matching technique can be employed as queries are progressively received.

20 Claims, 8 Drawing Sheets

(56) References Cited

OTHER PUBLICATIONS

Jacobs, Bryan, "How Shazam Works", Retrieved Date: Mar. 16, 2011, http://laplacian.wordpress.com/2009/01/10/how-shazam-works/.

"SoundHound", CrunchBase, Retrieved Date: Mar. 16, 2011, http://www.crunchbase.com/company/soundhound.

Purdy, Kevin, "Shazam vs. SoundHound: Battle of the Mobile Song ID Services", Lifehacker, Retrieved Date: Mar. 16, 2011, http://lifehacker.com/#15757214/shazam-vs-soundhound-battle-of-the-mobile-song-id-services.

* cited by examiner

QUERY AND MATCHING FOR CONTENT RECOGNITION

BACKGROUND

Music recognition programs traditionally operate by capturing audio data using device microphones and submitting queries to a server that includes a searchable database. The server is then able to search its database, using the audio data, for information associated with the content from which the audio data was captured. Such information can then be returned for consumption by the device that sent the query.

Users initiate the audio capture by launching an associated audio-capturing application on their device and interacting with the application, such as by providing user input that tells the application to begin capturing audio data. However, because of the time that it takes for a user to pick up her device, interact with the device to launch the application, capture the audio data and query the database, associated information is not returned from the server to the device until after a long period of time, e.g., 12 seconds or longer. This can lead to an undesirable user experience.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments enable audio data, such as music data, to be captured by a device, from a background environment and processed to formulate a query that can then be transmitted to a content recognition service. In one or more embodiments, multiple queries are transmitted to the content recognition service. In at least some embodiments, subsequent queries can progressively incorporate previous queries plus additional data that is captured. In one or more embodiments, responsive to receiving the query, the content recognition service can employ a multi-stage matching technique to identify content items responding to the query. This matching technique can be employed as queries are progressively received.

BRIEF DESCRIPTION OF THE DRAWINGS

While the specification concludes with claims particularly pointing out and distinctly claiming the subject matter, it is believed that the embodiments will be better understood from the following description in conjunction with the accompanying figures, in which:

DETAILED DESCRIPTION

Overview

Various embodiments enable audio data, such as music data, to be captured, by a device, from a background environment and processed to formulate a query that can then be transmitted to a content recognition service. In one or more embodiments, multiple queries are transmitted to the content recognition service. In at least some embodiments, subsequent queries can progressively incorporate previous queries plus additional data that is captured. In one or more embodiments, responsive to receiving the query, the content recognition service can employ a multi-stage matching technique to identify content items responding to the query. This matching technique can be employed as queries are progressively received.

In at least some embodiments, by transmitting progressive queries, latencies associated with query formulation can be reduced and results can be returned more quickly to the client device. For example, results that are ascertained based on an earlier query can relieve a device from having to further formulate queries, as will become apparent below.

In at least some embodiments, by employing a multi-stage, e.g., two-stage, matching technique, query complexity can be reduced and an increased query throughput can be achieved, as will become apparent below.

In the discussion that follows, a section entitled "Example Operating Environment" describes an operating environment in accordance with one or more embodiments. Next, a section entitled "Example Embodiment" describes various embodiments of generating queries for provision to a content recognition service. Following this, a section entitled "Example Content Recognition Executable Module" describes an example client executable module according to one or more embodiments.

In a section entitled "Example Content Recognition Service," a content recognition service in accordance with one or more embodiments is described. Finally, a section entitled "Example System" describes a mobile device in accordance with one or more embodiments.

Consider now an example operating environment in accordance with one or more embodiments.

Example Operating Environment

Figure 1:
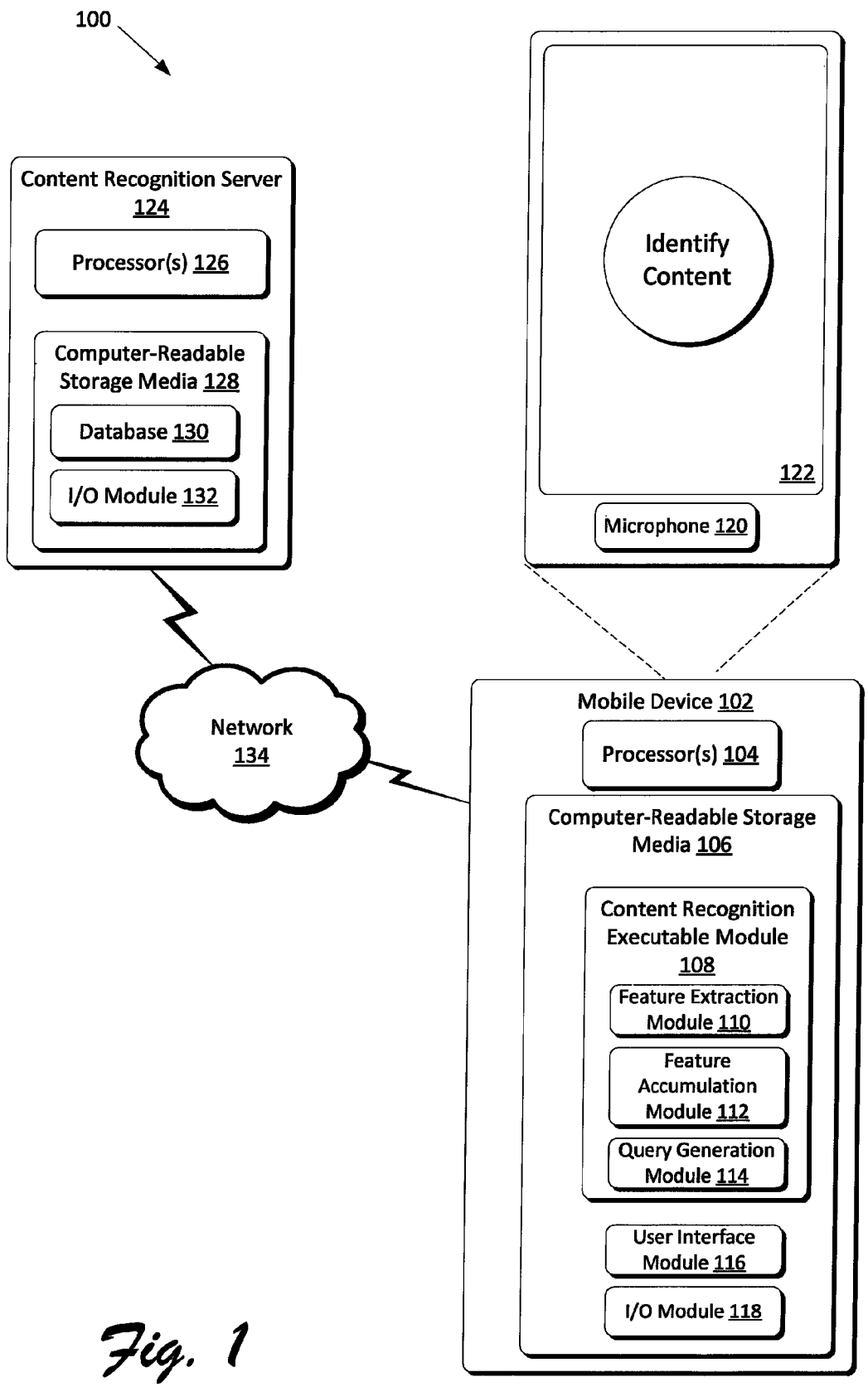
FIG. 1 is an illustration of an example environment in accordance with one or more embodiments.

FIG. 1 is an illustration of an example environment 100 in accordance with one or more embodiments. Environment 100 includes a client device in the form of a mobile device 102 that is configured to capture audio data for provision to a content recognition service, as will be described below. The client device can be implemented as any suitable type of device, such as a mobile device (e.g., a mobile phone, portable music player, personal digital assistants, dedicated messaging devices, portable game devices, netbooks, tablets, and the like).

In the illustrated and described embodiment, mobile device 102 includes one or more processors 104 and computer-readable storage media 106. Computer-readable storage media 106 includes a content recognition executable module 108 which, in turn, includes a feature extraction module 110, a feature accumulation module 112, and a query generation module 114. The computer-readable storage media also includes a user interface module 116 which manages user interfaces associated with applications that execute on the device and an input/output module 118. Mobile device 102 also includes one or more microphones 120 and a display 122 that is configured to display content.

Environment 100 also includes one or more content recognition servers 124. Individual content recognition servers include one or more processors 126, computer-readable storage media 128, one or more databases 130, and an input/output module 132.

Environment 100 also includes a network 134 through which mobile device 102 and content recognition server 124 communicate. Any suitable network can be employed such as, by way of example and not limitation, the Internet.

Display 122 may be used to output a variety of content, such as a caller identification (ID), contacts, images (e.g., photos), email, multimedia messages, Internet browsing content, game play content, music, video and so on. In one or more embodiments, the display 122 is configured to function as an input device by incorporating touchscreen functionality, e.g., through capacitive, surface acoustic wave, resistive, optical, strain gauge, dispersive signals, acoustic pulse, and other touchscreen functionality. The touchscreen functionality (as well as other functionality such as track pads) may also be used to detect gestures or other input.

The microphone 120 is representative of functionality that captures audio data for provision to the content recognition server 124, as will be described in more detail below. In one or more embodiments, when user input is received indicating that audio data capture is desired, the captured audio data can be processed by the content recognition executable module 108 and, more specifically, the feature extraction module 110 extracts features, as described below, that are then accumulated by feature accumulation module 112 and used to formulate a query, via query generation module 114. The formulated query can then be transmitted to the content recognition server 124 by way of the input/output module 118.

The input/output module 118 communicates via network 134, i.e., to submit the queries to a server and to receive displayable information from the server. The input/output module 118 may also include a variety of other functionality, such as functionality to make and receive telephone calls, form short message service (SMS) text messages, multimedia messaging service (MMS) messages, emails, status updates to be communicated to a social network service, and so on. In the illustrated and described embodiment, user interface module 116 can, under the influence of content recognition executable module 108, cause a user interface instrumentality—here designated "Identify Content"—to be presented to user so that the user can indicate, to the content recognition application, that audio data capture is desired. For example, the user may be in a shopping mall and hear a particular song that they like. Responsive to hearing the song, the user can launch, or execute, the content recognition executable module 108 and provide input via the "Identify Content" instrumentality that is presented on the device. Such input indicates to the executable module 108 that audio data capture is desired and that additional information associated with the audio data is to be requested. The content recognition executable module can then extract features from the captured audio data as described above and below, and use the query generation module to generate a query packet that can then be sent to the content recognition server 124.

Content recognition server 124, through input/output module 132, can then receive the query packet via network 134 and search its database 130 for information associated with a song that corresponds to the extracted features contained in the query packet. Such information can include, by way of example and not limitation, displayable information such as song titles, artists, album titles, lyrics and other information. This information can then be returned to the mobile device 102 so that it can be displayed on display 122 for a user.

Generally, any of the functions described herein can be implemented using software, firmware, hardware (e.g., fixed logic circuitry), or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer-readable memory devices. The features of the user interface techniques described below are platform-independent, meaning that the techniques may be implemented on a variety of commercial computing platforms having a variety of processors.

Having considered an example operating environment, consider now a discussion of an example embodiment.

Example Embodiment

Figure 2:
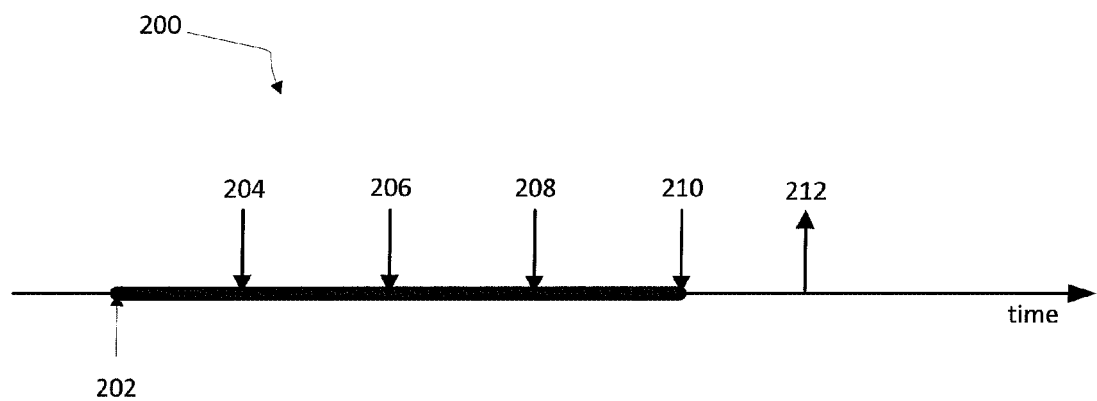
FIG. 2 depicts a timeline of an example implementation that describes audio capture in accordance with one or more embodiments.

To assist in understanding how query formulation can occur in accordance with one or more embodiments, consider FIG. 2 which depicts a timeline 200 along which audio data capture can occur.

In this timeline, the dark black line represents time during which audio data can be captured by the device. There are a number of different points of interest along the timeline. For example, point 202 depicts the beginning of audio data capture in one or more scenarios. This point can be defined at a point in time when a user launches a content recognition executable module or requests information regarding the audio data, such as by pressing the "Identify Content" button. Point 204 depicts the time at which a first query is transmitted to the content recognition server, point 206 depicts the time at which a second query is transmitted to the content recognition server, point 208 depicts the time at which a third query is transmitted to the content recognition server, point 210 depicts the time at which a fourth query is transmitted to the content recognition server, and point 212 depicts the time at which content information returned from the content recognition server is displayed on the device.

In one or more embodiments, the specific number of queries transmitted to the content recognition server can vary. For example, point 212 can occur just after point 204, thereby relieving the device of having to formulate queries associated with points 206, 208, and 210. For example, a user may be sitting in a café and request information on the song playing over the café speakers. At times when there is low or no other background noise, or perhaps when the query represents a unique portion of captured audio data, the content recognition server might be able to identify the associated song and return information corresponding to the song in response to the first query, sometime after point 204 but before point 206. However, at times when there is a lot of background noise, such as during a busy time in the café, or during other situations, the content recognition server may not be able to identify the song based on the first query at point 204 and one or more subsequent queries, e.g., the second query at point 206 or the third query at point 208. In this example, the content recognition server might identify the song and return information corresponding to the song in response to the fourth query at point 210. Because the content recognition server can in some cases identify the content after the first query rather than after subsequent queries, the time consumed by this process can be dramatically reduced in at least some instances, thereby enhancing the user's experience.

Having described an example timeline that illustrates a number of different scenarios, consider now a discussion of example methods in accordance with one or more embodiments.

Figure 3:
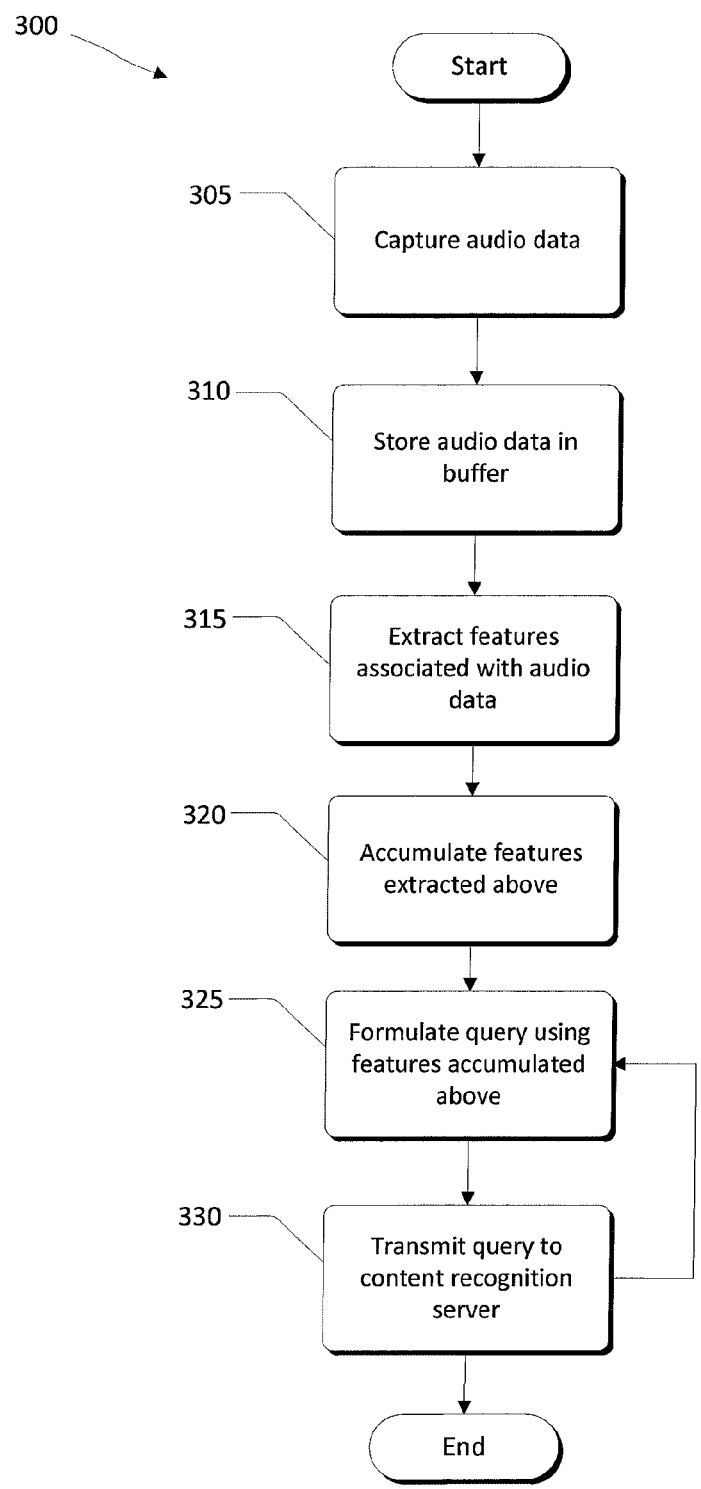
FIG. 3 illustrates a flow diagram that describes steps in an example method in accordance with one or more embodiments.

FIG. 3 is a flow diagram that describes steps in a method 300 in accordance with one or more embodiments. The method can be implemented in connection with any suitable hardware, software, firmware, or combination thereof. In at least some embodiments, the method can be implemented by a client device, such as a mobile device, examples of which are provided above.

At block 305, the mobile device captures audio data. This can be performed in any suitable way. For example, the audio data can be captured from a streaming source, such as an FM or HD radio signal stream. At block 310, the device stores audio data in a buffer. This can be performed in any suitable way and can utilize any suitable buffer and/or buffering techniques. At block 315, the device extracts features associated with the audio data. Examples of how this can be done are provided above and below. At block 320, the device accumulates the features extracted at block 315. This can be performed in any suitable way. The device formulates a query at block 325 using features that were accumulated in block 320. This can be performed in any suitable way. At block 330, the device transmits the query to a content recognition server for processing by the server. Examples of how this can be done are provided below.

Once the device has transmitted a query, it can return to block 325 to formulate another query using newly extracted and accumulated features. The query can then be transmitted at block 330. The generation of progressive queries can continue until the content recognition server returns content information in response to a query or until a pre-determined time or condition occurs. For example, with respect to the latter, the device may send five total progressive queries before indicating to the user to try again, or the device may capture audio data for a period of 30 seconds, one minute, or some other pre-determined time.

Accordingly, in at least some embodiments, the device enables termination query submission responsive to receiving displayable content information from the content recognition service. For example, if the device receives content information in response to a query during formulation of a subsequent query, the subsequent query can be terminated and will not be sent.

Figure 4:
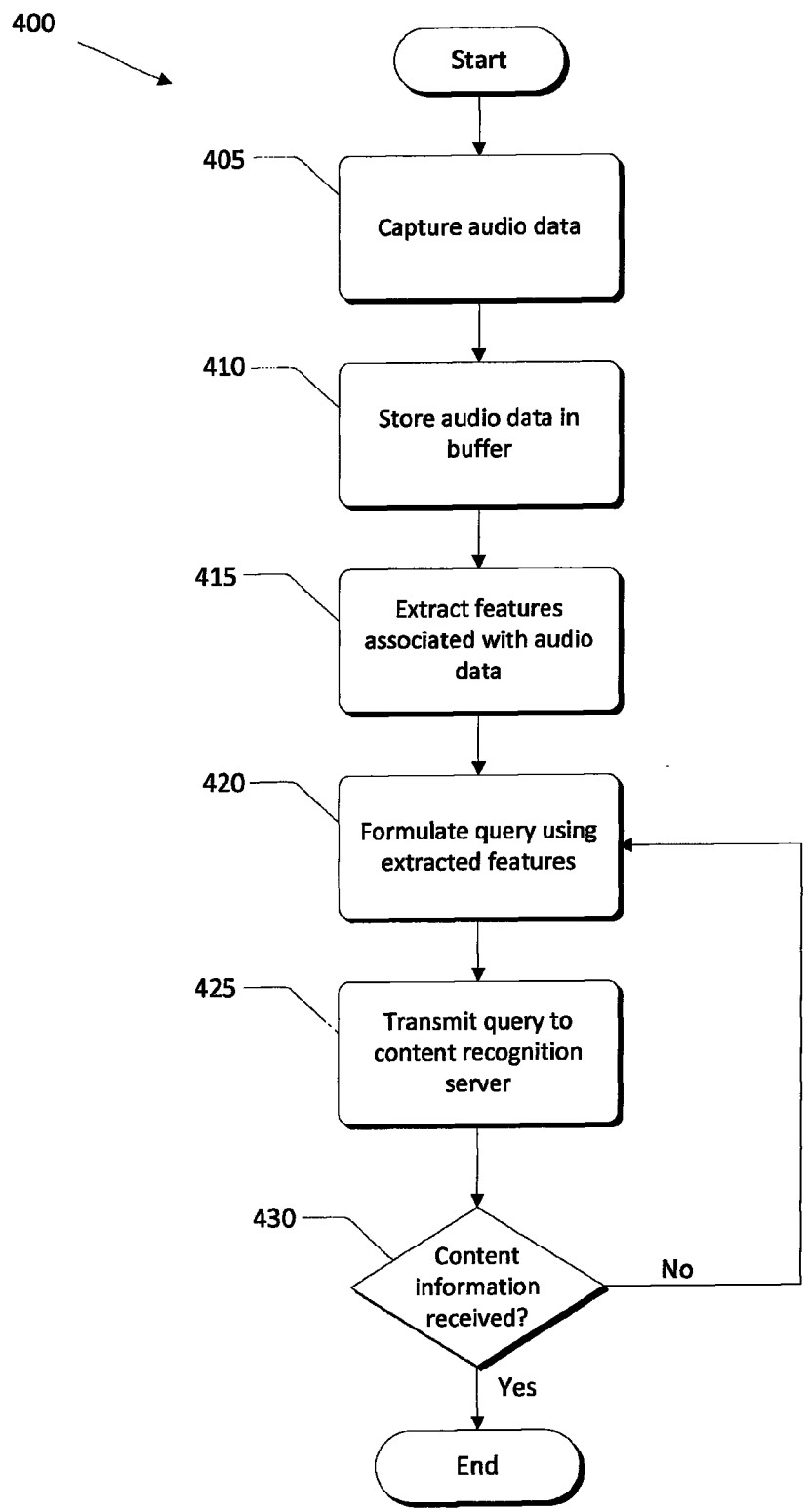
FIG. 4 illustrates a flow diagram that describes steps in another example method in accordance with one or more embodiments.

FIG. 4 is a flow diagram that describes steps in an alternative method 400 in accordance with one or more embodiments. The method can be implemented in connection with any suitable hardware, software, firmware, or combination thereof. In at least some embodiments, the method can be implemented by a client device, such as a mobile device, examples of which are provided above.

At block 405, the mobile device captures audio data. This can be performed in any suitable way. At block 410, the device stores audio data in a buffer. This can be performed in any suitable way and can utilize any suitable buffer and/or buffering techniques. At block 415, the device extracts features associated with the audio data. Examples of how this can be done are provided above and below. The device formulates a query at block 420 using features that were extracted at block 415. This can be performed in any suitable way. At block 425, the device transmits the query to a content recognition server for processing by the server. Examples of how this can be done are provided below. Block 430 ascertains whether content information has been received from the server. If content information has been received from the server, the device can discontinue generating queries, ending process 400, and can display the content information to the user. If not, the method can return to block 420 and generate subsequent queries as described above. In one or more embodiments, subsequent queries can include previously processed audio data from earlier queries. In this manner, the client device progressively accumulates the audio data. In one or more other embodiments, the subsequent queries can include new data such that the server can progressively accumulate the data.

Having described example methods in accordance with one or more embodiments, consider now an example Content Recognition Executable Module.

Example Content Recognition Executable Module

Figure 5:
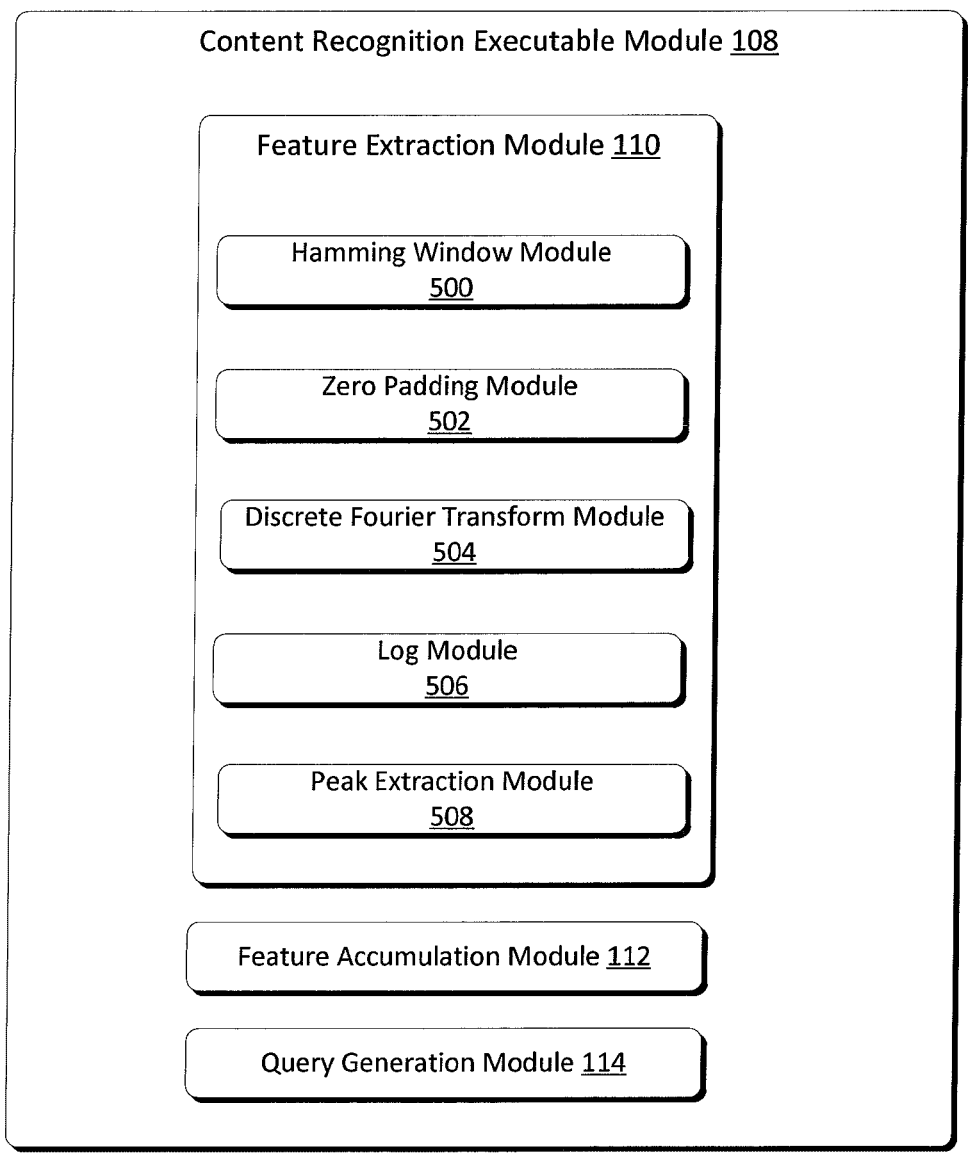
FIG. 5 is an illustration of an example content recognition executable module in accordance with one or more embodiments.

FIG. 5 illustrates one embodiment of content recognition executable module 108. In this example, feature extraction module 110 is configured to process captured audio data using spectral peak analysis so that feature accumulation module 112 can accumulate features and query generation module 114 can formulate a query packet for provision to content recognition server 124 (FIG. 1) as described below. In the illustrated and described embodiment, the processing performed by feature extraction module 110 can be performed responsive to various requests for content information. For example, a user can select a user instrumentality (such as the "Identify Content" button) on the display of the device.

Any suitable type of feature extraction can be performed without departing from the spirit and scope of the claimed subject matter. In this particular example, feature extraction module 110 includes a Hamming window module 500, a zero padding module 502, a discrete Fourier transform module 504, a log module 506, and a peak extraction module 508. As noted above, the feature extraction module 110 processes audio data in the form of audio samples received from the buffer in which the samples are stored. Any suitable quantity of audio samples can be processed out of the buffer. For example, in some embodiments, a block of 128 ms of audio data (1024 samples) are obtained from a new time position shifted by 20 ms. The Hamming window module 500 applies a Hamming window to the signal block. The Hamming window can be represented by an equation $$w(n) = 0.54 - 0.46 \cos\left(\frac{2\pi n}{N-1}\right)$$

where N represents the width in samples (N=1024) and n is an integer between zero and N−1.

Zero padding module 502 pads the 1024-sample signal with zeros to produce a 8192-sample signal. The use of zero-padding can effectively produce improved frequency resolution in the spectrum at little or even no expense of the time resolution.

The discrete Fourier transform module 504 computes the discrete Fourier transform (DFT) on the zero-padded signals to produce a 4096-bin spectrum. This can be accomplished in any suitable way. For example, the discrete Fourier transform module 504 can employ a fast Fourier transform algorithm e.g., the split-radix FFT or another FFT algorithm. The DFT can be represented by an equation $$X_k = \sum_{n=0}^{N-1} x_n \omega_N^{nk}$$

where $x_n$ is the input signal and $X_k$ is the output. N is an integer (N=8192) and k is greater to or equal to zero, and less than N/2 ($0 \leq k < N/2$).

Log module 506 applies the power of DFT spectrum to yield the time-frequency log-power spectrum. The log-power can be represented by an equation $$S_k = \log(|X_k|^2)$$

where $X_k$ is the output from the discrete Fourier transform module 504.

From the resulting time-frequency spectrum, peak extraction module 508 extracts spectral peaks as audio features in such a way that they are distributed widely over time and frequency.

In some embodiments, the zero-padded DFT can be replaced with a smaller-sized zero-padded DFT followed by an interpolation to reduce the computational burden on the device. In such embodiments, the audio data is zero-padded DFT with 2× up-sampling to produce a 1024-bin spectrum and passed through a Lancozos resampling filter to obtain the interpolated 4096-bin spectrum (4× up-sampling).

Once the peak extraction module extracts the spectral peaks as described above, the feature accumulation module 112 accumulates the spectral peaks for provision to the query generation module 114. The query generation module 114 formulates a query packet which can then be transmitted to the content recognition service.

In various embodiments, queries are progressively generated, each subsequent query including the features accumulated and used to formulate the previous query in addition to newly extracted spectral peaks. The feature accumulation module 112 accumulates the peaks extracted and processed from the beginning of the audio data capture, periodically providing them to the query generation module 114 for formulation into the subsequent query packet.

Having described an example content recognition executable module in accordance with one or more embodiments, consider now a discussion of an example content recognition service in accordance with one or more embodiments.

Example Content Recognition Service

In one or more embodiments, the content recognition service stores searchable information associated with songs that can enable the service to identify a particular song from information that it receives in a query packet. Any suitable type of searchable information can be used. In the present example, this searchable information includes, by way of example and not limitation, peak information such as spectral peak information associated with a number of different songs.

In this particular implementation example, peak information (indexes of time/frequency locations) for each song is sorted by a frequency index and stored into a searchable fingerprint database. In the illustrated and described embodiment, the database is structured such that individual frequency indices carry a list of corresponding time positions. A "best matched" song is identified by a linear scan of the fingerprint database. That is, for a given query peak, a list of time positions at the frequency index is retrieved and scores at the time differences between the database and query peaks are incremented. The procedure is repeated over all the query peaks and the highest score is considered as a song score. The song scores are compared against the whole database and the song identifier or ID with the highest song score is returned.

In some embodiments, beam searching can be used. In beam searching, the retrieval of the time positions is performed in a range starting from $B_L$ below to $B_H$ above. The beam width "B" is defined as $$B = B_L + B_H + 1$$

Search complexity is a function of B—that is, the narrower the beam, the lower the computational complexity. In addition, the beam width can be selected based on the targeted accuracy of the search. A very narrow beam can scan a database quickly, but it typically offers suboptimal retrieval accuracy. There can also be accuracy degradation when the beam width is set too wide. A proper beam width can facilitate accuracy and accommodate variances such as environmental noise, numerical noise, and the like. Beam searching enables multiple types of searches of varying accuracy to be configured from a single database. For example, quick scans and detailed scans can be run on the same database depending on the beam width, as will be appreciated by the skilled artisan. In some embodiments, such as the one shown in FIG. 5, a combination of a quick scan and a detailed scan is used.

Figure 6:
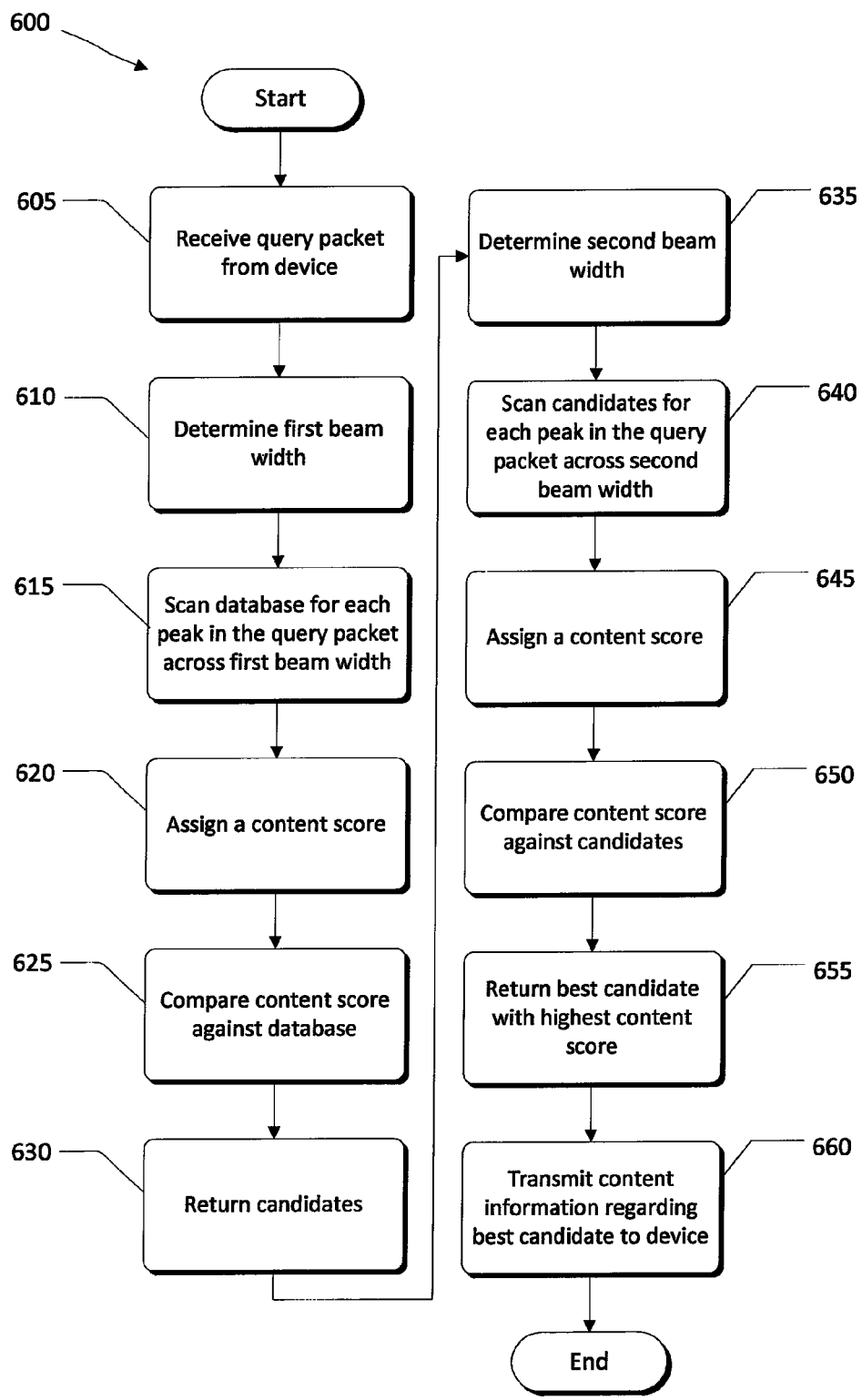
FIG. 6 illustrates a flow diagram that describes steps in an example method in accordance with one or more embodiments.

FIG. 6 depicts an example method 600 of a multi-stage, i.e., two-stage matching technique to determine a response to a query derived from captured audio data. At block 605, the content recognition server receives the query packet from the device, such as a mobile device. At block 610, the content recognition server determines a first beam width for use in searching a content database. The selected beam width can vary depending on the specific type of search to be performed and the selected accuracy rating for results, as will be appreciated by the skilled artisan.

At block 615, the content recognition server scans the content database for each peak in the query packet across the first beam width. This can be performed in any suitable way. For example, the content recognition server can extract the spectral peaks accumulated in the query packet into individual query peaks. Then, for each query peak, the content recognition server can scan the database using the selected beam width and retrieve a list of the time positions at the frequency index for that query peak. A score is incremented at the time differences between the database and query peaks. This procedure is repeated for each query peak in the query packet.

At block 620, the content recognition server assigns a content score to the query packet. This can be performed in any suitable way. For example, the content recognition server can select the highest incremented score for a query packet and assign that score as the content score.

Next, at block 625, the content recognition server compares the content score assigned at block 620 to the database and determines which content items in the database have the highest scores. At block 630, the content recognition server returns a number of candidates associated with the highest content scores. The number of candidates can vary, but in general, in at least some embodiments, can be up to about five percent (5%) of the number of content items in the database.

At block 635, the content recognition server determines a second beam width for use in scanning the candidates. The selected second beam width can vary depending on the selected accuracy rating for results, as will be appreciated by the skilled artisan, but can, in at least some embodiments, be wider than the first beam width.

At block 640, the content recognition server scans the candidates for each peak in the query packet across the second beam width. This can be performed in any suitable way. For example, the content recognition server can scan the candidates using the second beam width and retrieve a list of the time positions at the frequency index for that query peak. A score is incremented at the time differences between the candidate and query peaks. This procedure is repeated for each query peak in the query packet.

At block 645, the content recognition server assigns a content score to the query packet. This can be performed in any suitable way. For example, the content recognition server can select the highest incremented score for a query packet and assign that score as the content score.

Next, at block 650, the content recognition server compares the content score assigned at block 645 to the candidates. At block 655, the content recognition server returns the best candidate, which is the candidate associated with the highest content score. At block 660, the content recognition server transmits content information regarding with the best candidate to the mobile device. Content information can include displayable information, for example, a song title, song artist, the date the audio clip was recorded, the writer, the producer, group members, and/or an album title. Other information can be returned without departing from the spirit and scope of the claimed subject matter. This can be performed in any suitable way.

Figure 7:
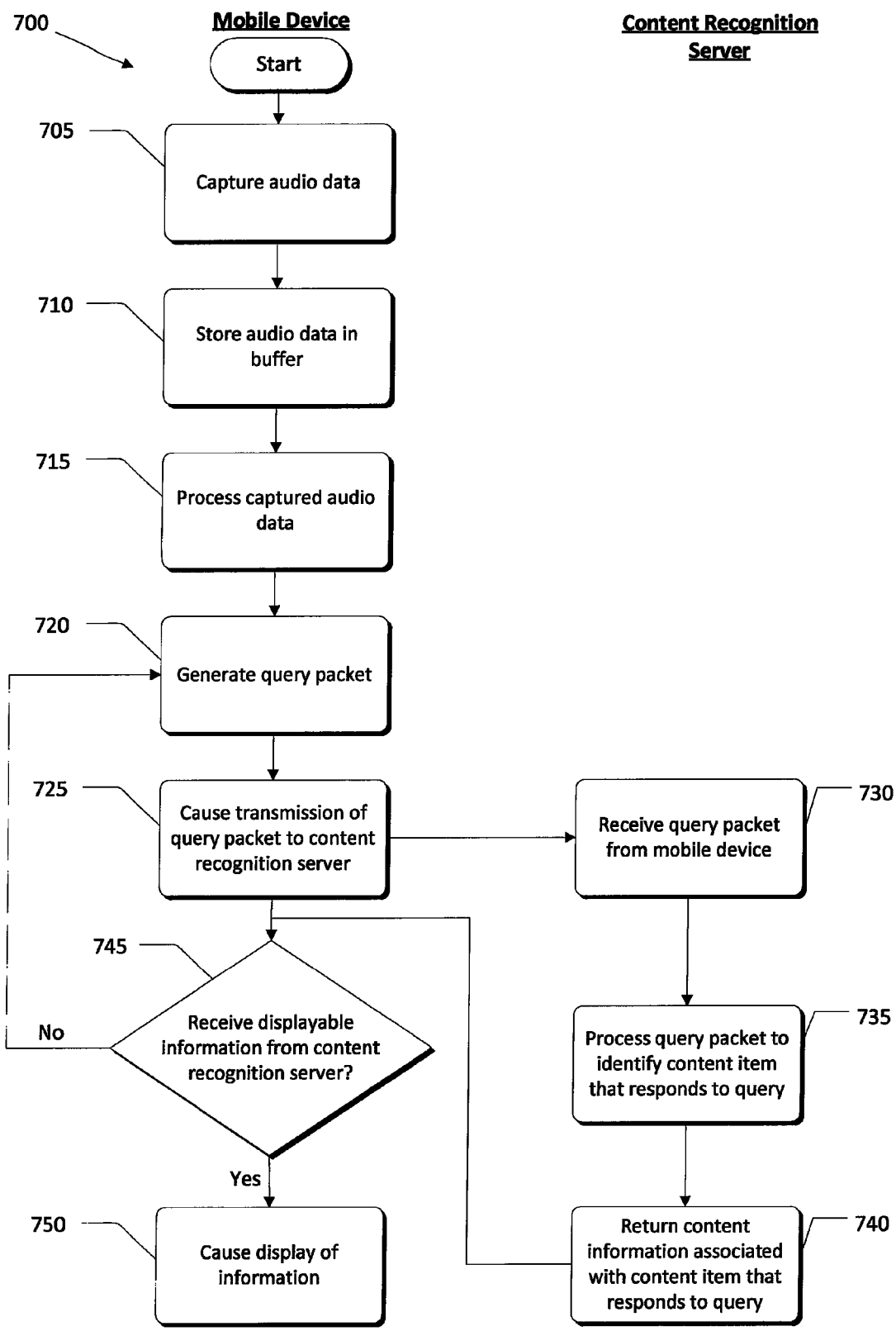
FIG. 7 illustrates a flow diagram that describes steps in another example method in accordance with one or more embodiments.

FIG. 7 depicts an example method 700 that describes operations that take place on both a mobile device and at a content recognition server. To that end, aspects of the method that are performed by the mobile device are designated "Mobile Device" and aspects of the method performed by the content recognition service are designated "Content Recognition Server."

At block 705, audio data is captured by the mobile device. This can be performed in any suitable way, such as through the use of a microphone as described above, or through capture of audio data being streamed over an FM or HD radio signal, for example.

Next, at block 710, the device stores the audio data in a buffer. This can be performed in any suitable way. In one or more embodiments, audio data can be continually added to the buffer, replacing previously stored audio data according to buffer capacity. For instance, the buffer may store the last five (5) minutes of audio, the last ten (10) minutes of audio, or the last hour of audio data depending on the specific buffer used and device capabilities.

At block 715, the device processes the captured audio data that was stored in the buffer at block 710 to extract features from the data. This can be performed in any suitable way. For example, in accordance with the example described just above, processing can include applying a Hamming window to the data, zero padding the data, transforming the data using FFT, and applying a log power. Processing of the audio data can be initiated in any suitable way, examples of which are provided above.

At block 720, the device generates a query packet. This can be performed in any suitable way. For example, in embodiments using spectral peak extraction for audio data processing, the generation of the query packet can include accumulating the extracted spectral peaks for provision to the content recognition server.

Next, at block 725, the device causes the transmission of the query packet to the content recognition server. This can be performed in any suitable way.

Next, at block 730, the content recognition server receives the query packet from the mobile device. At block 735, the content recognition server processes the query packet to identify a content item that responds to the query packet. This can be performed in any suitable way, examples of which are provided above.

At block 740, the content recognition server returns content information associated with the content item that responds to the query packet to the mobile device. Displayable content information can include, for example, a song title, song artist, the date the audio clip was recorded, the writer, the producer, group members, and/or an album title. Other information can be returned without departing from the spirit and scope of the claimed subject matter. This can be performed in any suitable way. In some implementations (not shown), the content recognition server can return a message indicating that no content was detected.

At block 745, the mobile device determines if it has received displayable information from the content recognition server. This can be performed in any suitable way. If so, at block 750, the mobile device causes a representation of the displayable content information to be displayed. The representation of the content information to be displayed can be album art (such as an image of the album cover), an icon, text, or a link. This can be performed in any suitable way.

If the mobile device has not received displayable information from the content recognition server, or if the mobile device has received a message indicating that no content was detected from the content recognition server, at block 745, the process returns to block 720 to and generates a subsequent query. In one or more embodiments, the loop continues until the mobile device receives information from the content recognition server, although the loop can terminate after a finite number of queries depending on the particular embodiment.

Having described an example method of capturing audio data for provision to a content recognition service and determining a response to a query derived from the captured audio data in accordance with one or more embodiments, consider now a discussion of an example system that can be used to implement one or more embodiments.

Example System

Figure 8:
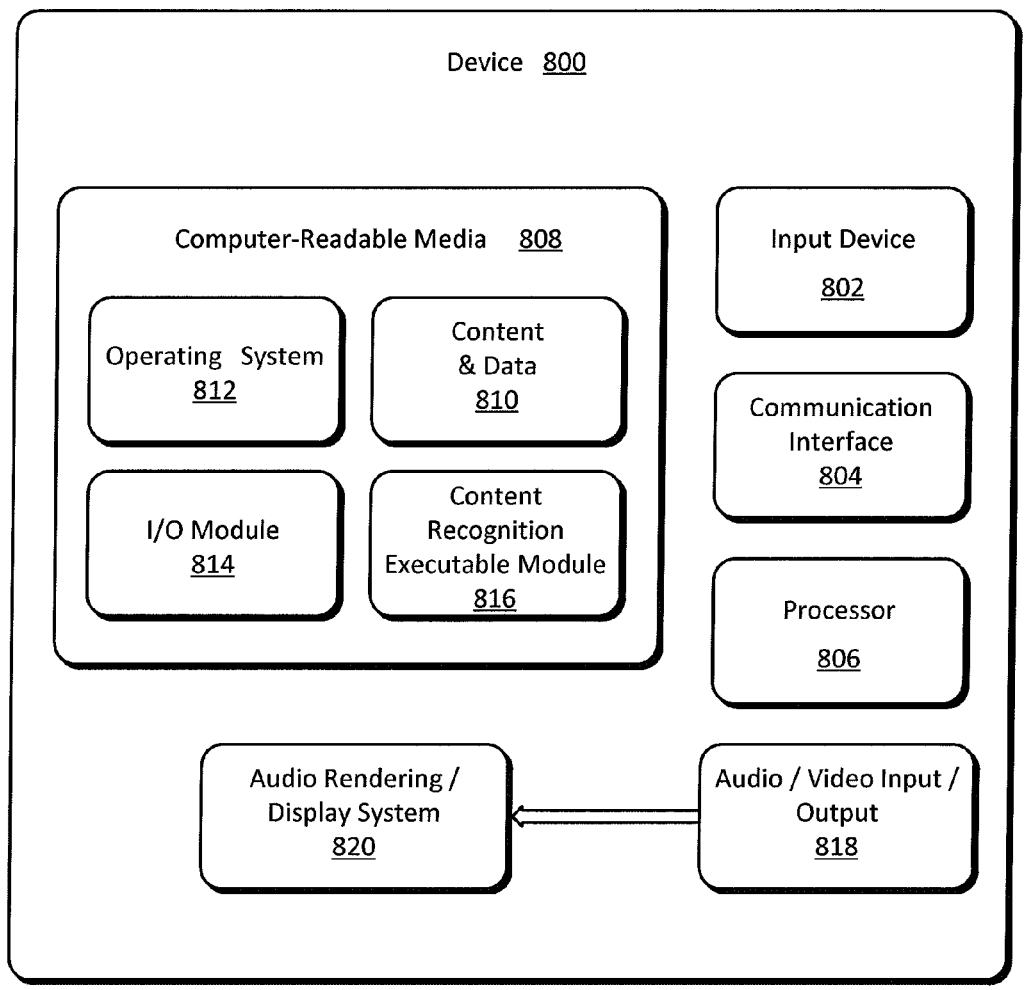
FIG. 8 illustrates an example client device that can be utilized to implement one or more embodiments.

FIG. 8 illustrates various components of an example client device 800 that can practice the embodiments described above. In one or more embodiments, client device 800 can be implemented as a mobile device. For example, device 800 can be implemented as any of the mobile devices 102 described with reference to FIG. 1. Device 800 can also be implemented to access a network-based service, such as a content recognition service as previously described.

Device 800 includes input device 802 that may include Internet Protocol (IP) input devices as well as other input devices, such as a keyboard. Device 800 further includes communication interface 804 that can be implemented as any one or more of a wireless interface, any type of network interface, and as any other type of communication interface. A network interface provides a connection between device 800 and a communication network by which other electronic and computing devices can communicate data with device 800. A wireless interface enables device 800 to operate as a mobile device for wireless communications.

Device 800 also includes one or more processor's 806 (e.g., any of microprocessors, controllers, and the like) which process various computer-executable instructions to control the operation of device 800 and to communicate with other electronic devices. Device 800 can be implemented with computer-readable media 808, such as one or more memory components, examples of which include random access memory (RAM) and non-volatile memory (e.g., any one or more of a read-only memory (ROM), flash memory, EPROM, EEPROM, etc.).

Computer-readable media 808 provides data storage to store content and data 810, as well as device applications and any other types of information and/or data related to operational aspects of device 800. One such configuration of a computer-readable medium is signal bearing medium and thus is configured to transmit the instructions (e.g., as a carrier wave) to the hardware of the computing device, such as via the network 102. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data. The storage type computer-readable media are explicitly defined herein to exclude propagated data signals.

An operating system 812 can be maintained as a computer executable module with the computer-readable media 808 and executed on processor 806. Device applications can also include an I/O module 814 (which may be used to provide telephonic functionality) and a content recognition executable module 816 that operates as described above and below.

Device 800 also includes an audio and/or video input/output 818 that provides audio and/or video data to an audio rendering and/or display system 820. The audio rendering and/or display system 820 can be implemented as integrated component(s) of the example device 800, and can include any components that process, display, and/or otherwise render audio, video, and image data. Device 800 can also be implemented to provide a user tactile feedback, such as vibrations and haptics.

As before, the blocks may be representative of modules that are configured to provide represented functionality. Further, any of the functions described herein can be implemented using software, firmware (e.g., fixed logic circuitry), manual processing, or a combination of these implementations. The terms "module," "functionality," and "logic" as used herein generally represent software, firmware, hardware or a combination thereof. In the case of a software implementation, the module, functionality, or logic represents program code that performs specified tasks when executed on a processor (e.g., CPU or CPUs). The program code can be stored in one or more computer-readable memory devices. The features of the techniques described above are platform-independent, meaning that the techniques may be implemented on a variety of commercial computing platforms having a variety of processors.

While various embodiments have been described above, it should be understood that they have been presented by way of example, and not limitation. It will be apparent to persons skilled in the relevant art(s) that various changes in form and detail can be made therein without departing from the scope of the present disclosure. Thus, embodiments should not be limited by any of the above-described exemplary embodiments, but should be defined only in accordance with the following claims and their equivalents.

What is claimed is:

1. One or more computer-readable storage media comprising instructions that are executable to cause a device to perform operations comprising:
   capturing, using a computing device, audio data, at least some of which is processable for provision to a content recognition service;
   extracting one or more features from a first portion of the audio data including applying a Hamming window to the first portion of the audio data and further processing the first portion of audio data to extract spectral peak data from the first portion of the audio data;
   formulating a query for submission to the content recognition service requesting identification of displayable content information associated with the audio data, the query including the one or more features extracted from the first portion of the audio data;
   submitting the query to the content recognition service;
   responsive to ascertaining that no displayable content information is received based on the query, submitting one or more subsequent queries to the content recognition service, the one or more subsequent queries comprising at least one of the one or more features extracted from the first portion of the audio data and used to formulate the first query, along with additional features not included in the first query; and
   terminating said submitting the one or more subsequent queries responsive to receiving the displayable content information from the content recognition service.

2. The one or more computer-readable storage media of claim 1, wherein the operations further comprise receiving, from the content recognition service, the displayable content information associated with the audio data.

3. The one or more computer-readable storage media of claim 2, wherein the displayable content information comprises one or more of a song title, an artist, an album title, a date an audio clip was recorded, a writer, a producer, or group members.

4. The one or more computer-readable storage media of claim 2, wherein the operations further comprise displaying the displayable information associated with the audio data.

5. The one or more computer-readable storage media of claim 1, wherein extracting the one or more features from the first portion of the audio data further comprises:
   zero padding the first portion of the audio data to which the Hamming window was applied;
   transforming, using a fast Fourier transform algorithm, the zero-padded audio data;
   producing a log-power time-frequency spectrum by applying a log power to the audio data to which the fast Fourier transform algorithm was applied; and
   extracting the spectral peak of each of the one or more features from the log-power time-frequency spectrum.

6. The one or more computer-readable storage media of claim 1, wherein the computing device is a mobile device.

7. A system comprising:
   one or more processors; and
   one or more memories storing instructions that are executable by the one or more processors to perform operations including:
      receiving, from a device, a first query including one or more features extracted from audio data captured by the device, each of the one or more features comprising at least spectral peak data associated with the audio data;
      processing the first query effective to attempt to identify a song associated with the audio data;
      receiving, from the device and independent of a prompt for a query, at least one additional query including at least one of the one or more features included in the first query and additional features extracted from additional audio data captured by the device that were not included in the first query, the additional features including spectral peak data associated with the additional audio data;
      processing the at least one additional query effective to attempt to identify the song associated with the additional audio data by:

scanning a content database across a first beam width corresponding to a frequency range to produce one or more content item candidates having peak information corresponding to the spectral peak data of the at least one additional query; and scanning the one or more content item candidates across a second beam width to produce a content item candidate with peak information corresponding to the spectral peak data of the first query and the at least one additional query;

identifying the song as the content item candidate corresponding to the first query and the at least one additional query; and responsive to identifying the song, returning content information associated with the song to the device.

8. The system of claim 7, wherein the spectral peak data associated with the first query and the spectral peak data associated with the at least one additional query comprise a time index and a frequency location corresponding to the spectral peak data.

9. The system of claim 7, wherein the second beam width is wider than the first beam width.

10. A computer-implemented method comprising:
receiving, from a device, a query comprising a time index and a frequency location corresponding to an extracted audio peak;
scanning a content database across a first beam width to produce one or more time positions at the frequency location corresponding to the extracted audio peak;
assigning a content score to each content item corresponding to the one or more time positions to identify a plurality of candidates from the plurality of content items, the content score corresponding to a difference between the one or more time positions of a content item and the time index of the extracted audio peak of the query and each of the candidates having a respective content score;
scanning, based on the content score assigned to each of the plurality of candidates, at least some of the plurality of candidates across a second beam width to produce one or more time positions at the frequency location corresponding to the extracted audio peak of the query;
identifying a candidate based on the one or more time positions produced by scanning the plurality of candidates across the second beam width; and
transmitting to the device displayable information regarding the candidate.

11. The computer-implemented method of claim 10, wherein the second beam width is wider than the first beam width.

12. The computer-implemented method of claim 10, wherein the displayable information comprises one or more of a song title, an artist, an album title, a date an audio clip was recorded, a writer, a producer, or group members.

13. The computer-implemented method of claim 10, further comprising receiving, from the device, at least one additional query comprising:
a time index and a frequency location corresponding to one or more additional extracted audio peaks; and
the time index and the frequency location corresponding to the one or more extracted audio peaks of the first query.

14. The computer-implemented method of claim 10, wherein the content item is a song.

15. One or more computer-readable storage media comprising instructions that are executable to cause a device to perform the method of claim 10.

16. The one or more computer-readable storage media of claim 1, wherein the spectral peak data comprises a time index and a frequency location corresponding to at least one spectral peak.

17. The system of claim 8, wherein said scanning the content database across the first beam width comprises:
producing one or more time positions at the frequency location corresponding to an extracted spectral peak; and
assigning a content score to a content item corresponding to each of the one or more time positions, the content score corresponding to a difference between the one or more time positions of the content item and the time index of the extracted spectral peak of the query, the content item corresponding to one of the one or more candidates; and
wherein the scanning the one or more candidates is based on the content score.

18. The system of claim 17, wherein scanning the one or more content item candidates across a second beam width comprises producing one or more time positions at the frequency location corresponding to the spectral peak data of the first query and the at least one additional query.

19. The system of claim 7, wherein the content information comprises one or more of a song title, an artist, an album title, a data an audio clip was recorded, a writer, a producer, or group members.

20. The system of claim 7, wherein the device is a mobile device.

* * * * *